(12) United States Patent
Höfer (10) Patent No.: US 6,695,569 B2
(45) Date of Patent: Feb. 24, 2004

(54) DEVICE FOR COLLECTING AND PALLETIZING BOTTLES

(75) Inventor: Gunter Höfer, Prittriching (DE)

(73) Assignee: Certus Maschinenbau GmbH, Friedberg (DE)

( * ) Notice: Subject to any disclaimer, the term of this patent is extended or adjusted under 35 U.S.C. 154(b) by 20 days.

(21) Appl. No.: 09/901,875

(22) Filed: Jul. 9, 2001

(65) Prior Publication Data

US 2001/0038792 A1 Nov. 8, 2001

Related U.S. Application Data

(63) Continuation of application No. 09/402,606, filed as application No. PCT/EP98/02399 on Apr. 23, 1998, now abandoned.

(30) Foreign Application Priority Data

Apr. 23, 1997 (DE) ..................................... 297 07 324 U (51) Int. Cl.[7] .............................................. B65G 57/24
(52) U.S. Cl. ................ 414/792.9; 414/789.5; 414/791.7
(58) Field of Search .......................... 198/465.1, 469.1, 198/473.1; 414/789.5, 416, 791.6, 791.7, 792.9, 799, 927, 928, 929

(56) References Cited

U.S. PATENT DOCUMENTS

| 4,251,979 A | * | 2/1981 | Horigome et al. ............. 53/543 |
| 4,259,826 A | * | 4/1981 | Campbell ..................... 53/543 |
| 4,277,932 A | * | 7/1981 | Campbell ..................... 53/497 |
| 5,267,590 A | * | 12/1993 | Pringle ................. 414/791.7 X |
| 6,196,788 B1 | * | 3/2001 | Talbot et al. .......... 414/791.7 X |

FOREIGN PATENT DOCUMENTS

| DE | 39 26 650 | * | 2/1991 |
| EP | 0 291 674 | * | 11/1988 |
| EP | 0 659 664 | * | 6/1995 |
| GB | 2 168 024 A | * | 6/1986 |
| WO | 97/11898 | * | 4/1997 |

* cited by examiner

Primary Examiner—Janice L. Krizek
(74) Attorney, Agent, or Firm—McGlew and Tuttle, P.C.

(57) ABSTRACT

A process and a device for collecting and palletizing bottles 3 is provided, especially empty plastic bottles, which are fed from a bottle producer 36 or a bottle conveyor 8 in one or more rows one behind the other to a collecting device 4. They are transferred there to one or more intermediate carriers 6, forming bottle layers 25, wherein the loaded intermediate carriers 6 are subsequently conveyed to a palletizing device 7. The intermediate carriers 6 move in a circle in the collecting and palletizing unit 2 and can also be transferred into a storage facility 7 for intermediate storage.

20 Claims, 6 Drawing Sheets

DEVICE FOR COLLECTING AND PALLETIZING BOTTLES

CROSS REFERENCE TO RELATED APPLICATION

This application is a continuation of application Ser. No. 09/402,606 filed Oct. 22, 1999, now abandoned, which is the National Stage of PCT/EP98/02399 filed Apr. 23, 1998.

FIELD OF INVENTION

The present invention pertains to a process and a device for collecting empty bottles, especially plastic bottles, and for palletizing the bottles.

BACKGROUND OF THE INVENTION

EP-0 659 664 A1 shows such a collecting and palletizing device for empty plastic bottles. It comprises a palletizing device, a collecting device arranged upstream of it, and a conveying device arranged between them. The collecting device is connected to a bottle conveyor and is used to transfer the bottles fed in a single row by the bottle conveyor and to arrange them in layers. The collecting device has a circulating rolling belt onto which the bottles are pushed via a funnel-like expansion of the bottle conveyor, wherein the bottles are piled up and are positioned in transverse rows, closing the gaps. The bottles on the rolling belt are pushed by means of profiled pushers to spacers provided on the palletizing unit and are stacked up in layers one after the other by means of an elevator. This collection and palletizing technique is suitable for heavy and stable bottles. In contrast, it cannot be used with sufficient reliability for lightweight plastic bottles, especially so-called PET bottles. These types of bottle are difficult to handle because of their low weight, the electrostatic charge and the high rate of feed by the bottle conveyor.

A similar collecting and palletizing device is also shown in WO 97/11898. The collecting device has a sorting unit here, which joins a two-armed bottle conveyor and comprises a circulating conveyor belt and a plurality of rigid row supports for the bottles. The bottles fed in obliquely by the bottle conveyor move into the row supports one after the other and at the end, forming bottle layers, they enter a pusher, which pushes them off onto a conveyor belt, on which they are moved to the palletizing device with a lifting table.

Furthermore, the conveying of PET bottles by means of pneumatic conveyors has been known in practice. These conveyors have a very complicated design, require much space and are expensive. In addition, considerable problems arise in terms of hygiene.

A filling unit, in which bottles are cleaned, filled with syrup or finished beverages, subsequently closed with caps and then palletized at the end, has been known from EP-0 291 674 A1. Before palletization, the individual bottles are packed in usual bottle carriers. These are either cardboard boxes or plastic carriers. The filled bottles are then conveyed with this packaging to the palletizing device. The packing of the bottles takes place only after the passage through the filling unit. The bottles can be rotated within the filling unit.

SUMMARY AND OBJECTS OF THE INVENTION

The primary object of the present invention is to show a possibility for the operationally reliable handling of even these critical types of bottle.

According to the invention a process is provided for collecting empty bottles, particularly plastic bottles, for palletizing the bottles. The empty bottles are fed in from a bottle producer or a bottle conveyor in one or more rows. The bottles are taken over with at least one upstream collecting device and are later fed to a palletizing device and are palletized there. The empty bottles fed in are transferred at the collecting device onto to one or more intermediate carriers. The carriers form bottles layers. The intermediate carrier with the bottles is subsequently conveyed to the palletizing device.

According to another aspect of the invention, a device is provided for collecting the empty bottles, particularly plastic bottles and for palletizing the bottles. The device has at least one palletizing device with at least one upstream collecting device for taking over the empty bottles being fed in one or more rows from a bottle producer or from a bottle conveyor. A conveying means is arranged between the palletizing and the collecting device. The collecting device has at least one transfer unit and one or more intermediate carriers conveyable with the conveying means for taking up the empty bottles in layers.

The transfer of the bottles onto a conveyable intermediate carrier offers a higher reliability of operation compared with the state of the art and makes possible a plurality of functional variants. This is especially true in regard to the capacity of the plant, which can be increased, storage possibilities and various internal and external carrier circulations. It is particularly advantageous here that the intermediate carrier can stop during the transfer process, which ensures high accuracy of deposition and positioning. The formation of layers on the intermediate carrier makes it possible to commission the bottles according to the pallets and to reach a high palletizing capacity.

For high plant capacity, it is recommended that the collecting device be equipped with a plurality of intermediate carriers and that these be moved to and fro between the transfer unit and the palletizing device in parallel or in circulation. As a result, the transfer unit has no interruptions because of the conveying of the intermediate carriers. It is also favorable to arrange two or more bottle layers corresponding to the pallet size. As a result, the performance capacity is increased further and, in addition, a buffering possibility is created for possible disturbances in operation.

The present invention ensures, preferably by an essentially continuous guiding of the bottles from the row support at the bottle conveyor to the palletizing device, that the bottles will always be in a secured position and can also be accurately positioned. The bottles cannot fall over any more and they cannot cause disturbances in operation. In particular, the device according to the present invention is also able to take up bottles, to transfer them, to arrange them in layers, and to feed the palletizing device on the intermediate carrier at very high feed rates. The device according to the present invention has a very high performance capacity as a result.

It is particularly advantageous that the closing of the row of bottles being fed at laterally spaced locations is also performed with a high reliability. The closing of the row is performed during the transfer within the gripping means by laterally adjustable row grippers. The bottles can then be ultimately arranged in the bottle layer formed on the intermediate carrier in a closely packed arrangement suitable for the ultimate palletization. The device according to the present invention can also be set and changed over for different bottle formats with relatively little effort.

During the transfer or transposition of the rows of bottles, intermediate storage or buffering may be performed by means of a piling table or the like. However, it is also possible to load the gripping means of the transfer unit directly at the bottle conveyors or in the bottle producer and to push the bottles directly into the bottle grippers. This makes possible a very rapid transfer and the very rapid formation of bottle layers.

Railing-like bottle guides, which are adjustable in width, ensure the optimal lateral guiding in the row support. In addition, axial guiding can be brought about in the row supports by means of movable stops driven in a controlled manner, so that the bottles taken over cannot fall over in any direction. The rows can be shifted axially in relation to one another by means of a suitable offset of the stops such that they are arranged with the rows offset so as to fill the gaps in relation to one another and can be packed with maximum density in the bottle layer.

The preferred embodiment of the bottle guide at the intermediate carrier makes it possible to arrange the bottles tightly next to one another and yet to make possible a lateral guiding. This guiding also facilitates the insertion of the rows of bottles on the intermediate carrier and the takeup of the bottle layer on the palletizing device.

The arrangement of a collecting device in the immediate vicinity of a bottle producer makes it possible to eliminate the need for complicated, large pneumatic conveyors with their large space requirement and to make do with short discharge conveyors. As a result, the bottles being produced are taken up very rapidly, transferred and deposited on one or more movable intermediate carriers for further handling.

An individual bottle producer is preferably associated with an individual collecting device each with a capacity coordinated with the bottle production. More collecting devices are correspondingly provided for plants of a higher capacity with a plurality of bottle producers or blowing units. The fault and failure liability during the direct loading of the intermediate carriers at the bottle producer is most extensively minimized in the case of the design according to the present invention. This increases the operational reliability of the entire plant. The question of capacity can be solved by jointly connecting the collecting devices to a common conveying means and especially by arranging an intermediate storage facility for the empty and/or loaded intermediate carriers. This makes it possible to use especially a central palletizing unit for the entire plant and to further reduce the risk of failure. The intermediate storage facility equalizes the different throughputs of the bottle producers and the central palletizing device, on the one hand, and may also be used as a buffer in the case of the failure or disturbance of individual components of the plant, on the other hand. First of all, the bottle produced is uncoupled from any disturbing effects from the area of the palletizing device or the conveying system. The collecting and palletizing device according to the present invention may be expanded into larger bottle handling plants, in which the individual devices may overlap and complement one another. The number and the assignment of the individual components, the collecting device and the palletizing device, can also be adapted in a suitable manner.

The collecting and palletizing device according to the present invention requires relatively little design and control engineering efforts despite a high level of reliability. It also has a small space requirement and can be expanded as desired in the above-mentioned manner. Existing plants can also be retrofitted with it. The collecting and palletizing device according to the present invention is not bound to certain bottle materials or formats, but it can be used for any bottles. Furthermore, it does not require a specially trained operating personnel.

In the preferred embodiment, the intermediate carriers circulate within the bottle handling system and are used to convey the empty bottles layer by layer between the bottle producer and the palletizing device. Moreover, the intermediate carrier may, however, also circulate in a larger circulation by acting as part of the pallet itself and reaching, together with the empty bottles, first the filling plant and farther from there optionally also the customer via the commercial connections. They may optionally also be returned from the customers into the bottle handling system. This form of intermediate carriers with a preferably permanent bottle guiding in the entire circulation facilitates the different bottle handling processes and simplifies the construction efforts and the machinery at the bottle producer, filler and in logistics.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
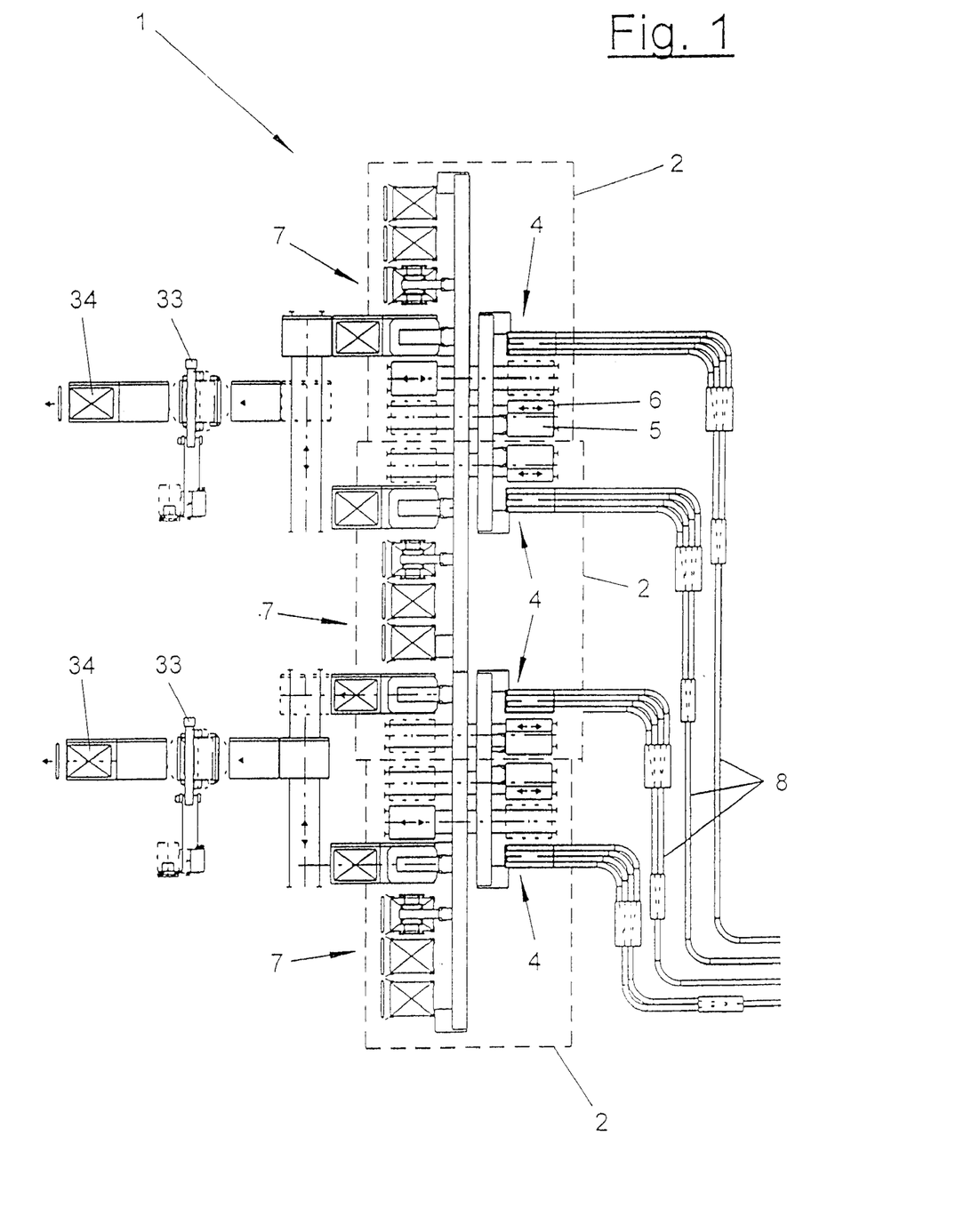
FIG. 1 is a schematic diagram of the plant showing a bottle handling system with a plurality of collecting and palletizing units.
Figure 2:
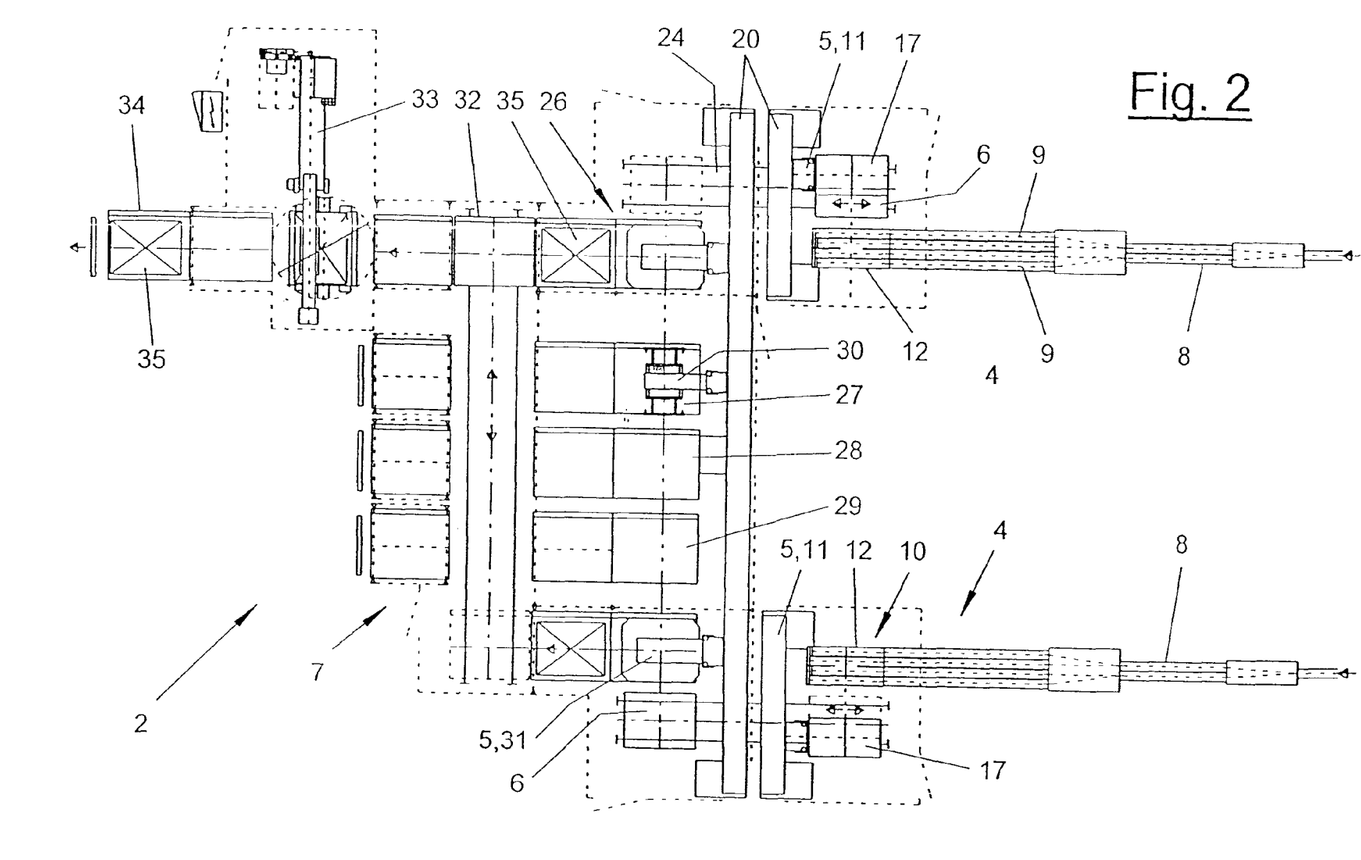
FIG. 2 is an enlarged detailed schematic diagram of a collecting and palletizing unit according to FIG. 1.
Figure 3:
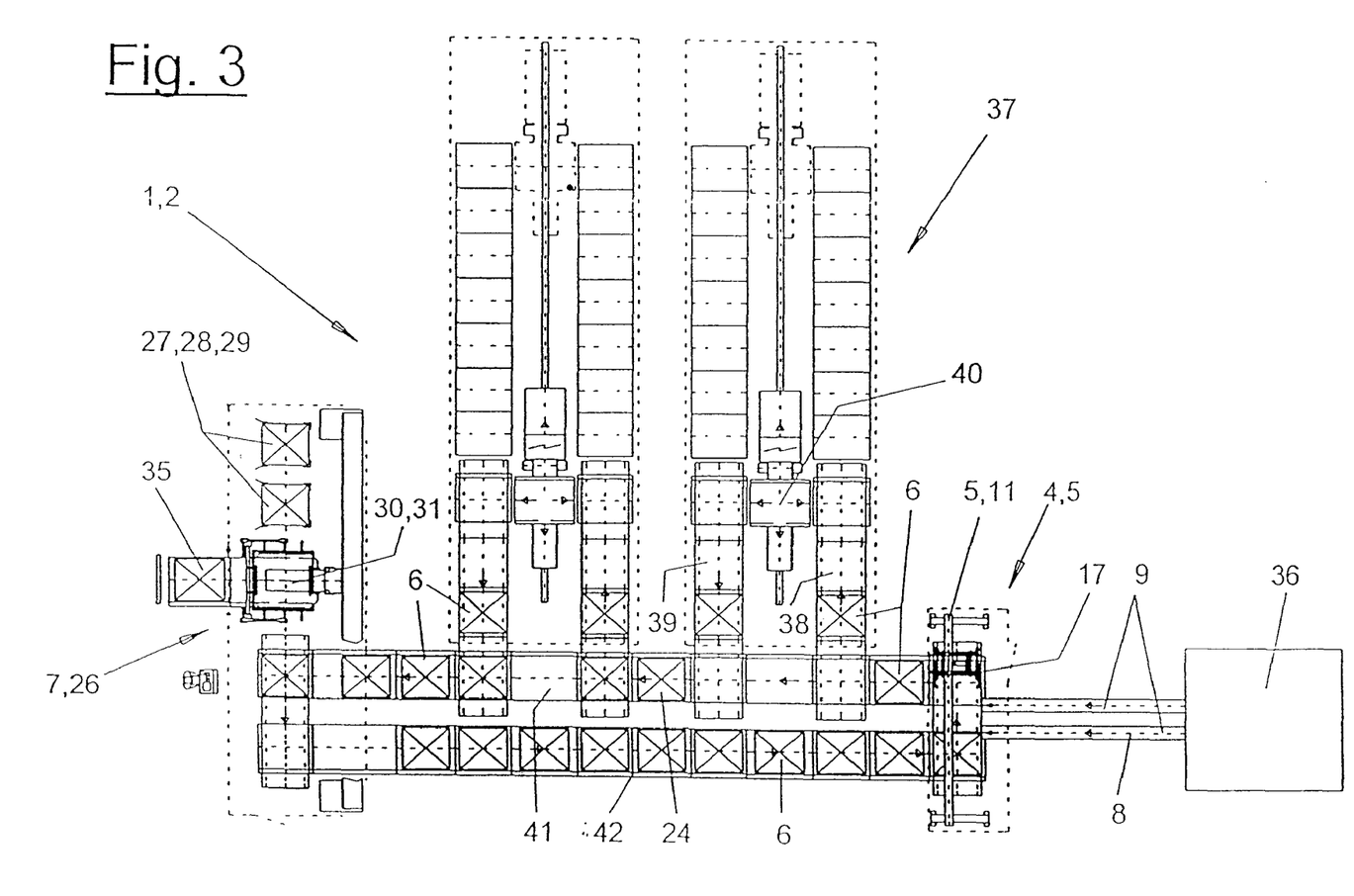
FIG. 3 is a schematic diagram showing a variant of the bottle handling system from FIGS. 1 and 2 with a collecting and palletizing unit at a blowing machine.

In schematic diagrams, FIGS. 1, 2 and 3 show a bottle handling system 1, which contains one or more collecting and palletizing units 2. The collecting and palletizing unit 2 comprises a collecting device 4 and a palletizing device 7 each. The collecting devices 4 in turn have one or more transfer units 5 and one or more movable or conveyable intermediate carriers 6, which connect the collecting device 4 to the corresponding palletizing device 7.

The collecting and palletizing unit 2 takes up the bottles 3 being fed in in one or more rows or lines 9 from a bottle producer 36 (not shown in FIGS. 1 and 2) via one or more bottle conveyors 8, collects them in bottle layers 25 and stacks these up in multilayer pallets 35. One or more packaging devices 33 along with discharge stations 34 may join the palletizing device 7 on the outlet side.

In the embodiment shown in FIG. 1, the bottle handling system 1 has, e.g., three collecting and palletizing units 2, which are arranged in series next to one another. Broken lines indicate the boundaries of the units. FIG. 2 shows the middle collecting and palletizing unit 2 on a larger scale.

The middle unit 2 is joined by two bottle conveyors 8 and the two outer units 2 are joined by a bottle conveyor 8 each. The bottle conveyors 8 are preferably designed as pneumatic conveyors in FIGS. 1 and 2. These have a slotted air flow duct, in which the bottles 3 are guided hanging by the said neck or collar and are driven forward by air flow shooting along in the duct. The bottles 3 move in the bottle conveyor 8 at a very high rate of, e.g., 10 bottles per second. To make it nevertheless possible to handle the bottles 3, each bottle conveyor 8 is gradually divided into a plurality of lines 9 via switches. For example, four such lines 9 open in parallel next to one another into the collecting and palletizing units.

The bottle producer 36 comprises, e.g., one or more blowing machines for plastic bottles. It is arranged at a greater distance from the collecting and palletizing unit 2 in the exemplary embodiment according to FIGS. 1 and 2, as a result of which the bottle conveyors 8 have a correspondingly great length and are preferably designed for this purpose as pneumatic conveyors in the above-mentioned manner.

In the variant according to FIG. 3, the bottle producer 36 is in the immediate vicinity of the collecting and palletizing unit 2. The bottle conveyors 8 are preferably designed here as short and straight conveyors, which transfer the bottles 3 produced and continuously discharged by the bottle producer 36 to the collecting device 4 with the transfer unit 5 in, e.g., two rows or lines. Branchings into more than two lines 9 may also be present before or at the transfer point. The bottle conveyor or conveyors 8 may have any desired, suitable design. They may be, e.g., short pneumatic conveyors. However, they may also have any other desired, suitable design. The bottle conveyors 8 may preferably have a suitable and preferably small piling section or buffer section for transferring the bottles 3 being fed in continuously in rows one behind the other to the intermittently operating transfer unit 5. In a modified embodiment, the bottle producer 36 may also transfer its bottles 3 directly to the transfer unit 5.

FIG. 3 also shows that the collecting and palletizing unit 2 may also have an intermediate storage facility 37, which is arranged between the collecting device 4 and the palletizing device 7. A conveying means 24, which preferably operates in circulation and has a feed branch 41 and a return branch 42, is provided for the conveying of the individually movable intermediate carriers 6. The conveying means 24 connects the collecting device 4 to the palletizing device 7. In addition, the intermediate storage facility 37 also joins the conveying means 24 and preferably its feed branch 41.

The intermediate storage facility 37 may have any desirable, suitable design, e.g., it may be designed as a high-shelf storage area. It may have one or more storage rows correspondingly with one or more suitable high-bay storage and retrieval units 40. The individual storage areas have an input 38 and an output 39 for the loaded intermediate carriers 6, both of them preferably joining the freed branch 41. The high-bay storage and retrieval unit 40 takes then over the intermediate carriers 6 within the shelf from the input and stores them in the storage positions provided. Conversely, the high-bay storage and retrieval unit 40 delivers the intermediate carriers 6 via the output 39. They reach the palletizing device 7 directly via the feed branch 41. On the return branch 42, the unloaded and empty intermediate carriers 6 are again fed from the palletizing device 7 to the collecting device 4 with the transfer unit 5. The return branch 42 may have a piling section. However, the return branch 42 may also be joined by a separate storage facility for buffering the intermediate carriers 6. This carrier storage facility is not shown for clarity's sake.

The feed branch 41 and the return branch 42 are preferably designed as straight conveying rows. They may be conveyor belts, roller conveyors or other suitable conveying means. The transfer of the intermediate carriers 6 takes place at the end points via corresponding cross belts. At the end-side cross belt, the palletizing device 7 takes over the bottle layers 25 from the intermediate carriers 6, so that the empty intermediate carriers 6 can then move back onto the return branch 42. At the front end, the cross belt is located in the area of the collecting device 4 and of the transfer unit 5. As a result, completely loaded intermediate carriers 6 can be delivered very rapidly to the feed branch 41 without interruption in time and without interruption of the cycle and new, empty intermediate carriers 6 can be brought into the loading position. As a result, the next, empty intermediate carrier 6 can also already be loaded at the collecting device 4 during the conveying and during the unloading at the palletizing device 7.

Figure 4:
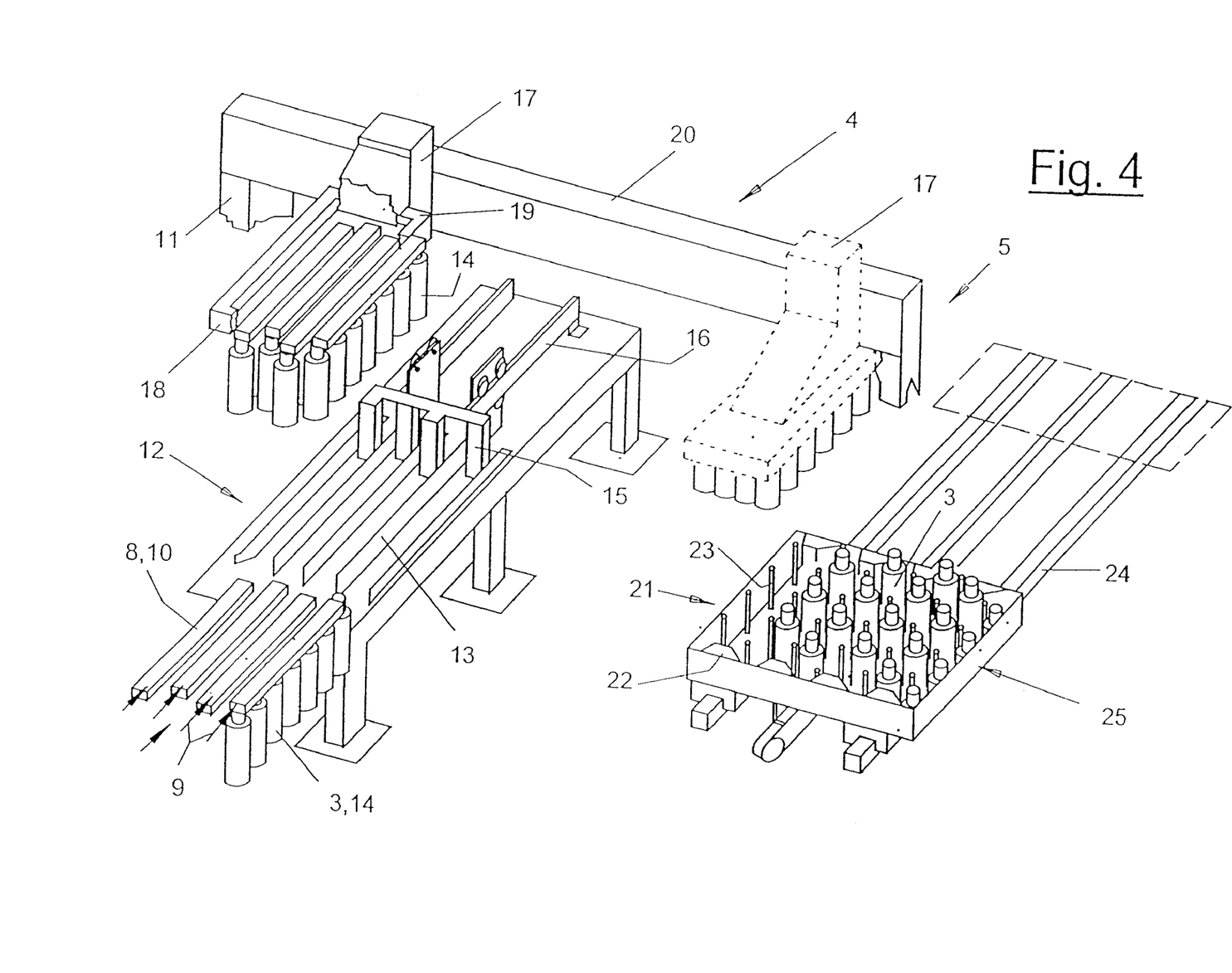
FIG. 4 is a perspective view of the collecting device of a collecting and palletizing device.

FIGS. 1, 2 and 4 show a variant for the intermediate carriers 6 and the conveying means 24. In the embodiment shown, it is a shuttle, which performs straightforward and reverse movements and moves the intermediate carriers 6 to and fro on a straight path from their takeup position at the collecting device 4 to the transfer position at the palletizing device 7.

Another variant is shown in the embodiment according to FIG. 1. For example, one intermediate carrier 6 each with shuttles 24, which operate staggered in time, are arranged in parallel next to one another at the two outer collecting devices 4 here. This also makes possible an overlap of the cycle times during the loading and unloading as well as during the conveying of the intermediate carriers 6. The direction of conveying of the intermediate carriers 6 is along the rows 14 of bottles and at right angles to the cross arms 20 in the preferred embodiment.

FIG. 1 also shows collecting devices 4 of different capacities. The two outer collecting devices 4 are designed for a high capacity of, e.g., 100,000 bottles per hour, and they have correspondingly high-speed transfer units 5 for this purpose. The middle collecting device 4 has a lower capacity and slower transfer units 5. However, the collecting device 4 may have two transfer units 5 with an intermediate carrier 6 each along with a conveying means 24 for compensation and for space reasons, with a bottle conveyor 8 being associated with each transfer unit 5 in the above-described manner. The transfer units 5 may have a separate cross arm 20 each or a common cross arm 20.

The bottles 3 preferably consist of plastic, especially PET plastic. These so-called PET bottles are thin-walled and have low weight. On their neck, they have a circular and laterally projecting collar, by which they can be grasped and guided, hanging, by the bottle conveyors 8. These bottles usually have a central indentation at the bottom and a plurality of upwardly extending notches at the surrounding edge, so that the base is formed by five contact points distributed around the central axis of the bottle. The diameter of the base is smaller than the external diameter of the bottles, so that the PET bottles have a certain liability. The bottles 3 may also become charged electrostatically and mutually repel one another as a result. Due to the low stability and the low weight, the bottles 3 are sensitive to mechanical shocks, air flows, etc., and tend to fall over.

FIG. 4 shows the opening or end area 10 of the bottle conveyor 8 at the collecting device 4. The bottles 3 arrive here row by row in rows or lines one behind the other and are stopped by controllable closures (not shown) at the end of the conveyor 8. A piling or discharge section, in which, e.g., the conveying air is also blown off, is located in this area. The bottles 3 located in the end area 10 are driven forward from behind by the bottles moving behind them. FIG. 4 also shows how the bottles 3 are hanging by their necks in the conveying channels.

FIG. 4 shows specifically an embodiment of the collecting device 4 The embodiment corresponds to FIGS. 1 and 2, but it may also be used in a unit according to FIG. 3. The collecting device 4 comprises at least one row support 12 and at least one transfer unit 5 each and preferably a plurality of intermediate carriers 6. The collecting device 4 has a plurality of positive-locking bottle guides 13, 18, 21. As a result, the bottles 3 are taken over from the bottle conveyor 8 row by row, transferred onto the intermediate carrier 6, grouped to form a bottle layer 25, and then fed to the palletizing device 7, while the bottles 3 are preferably being guided essentially upright such that they cannot fall over and can move in a limited and controlled manner only. The intermediate carrier 6 is stopped during the transfer and loading process.

The row support 12 joins the end area 10 of the bottle conveyor 8. The row support 12 has a, e.g., stationary piling table with a plurality of support aisles and railing-like bottle guides 13, which extend in a corresponding number and in extension of the end areas 10 of the bottle conveyor 8 and laterally guide the bottles 3 taken over from the bottle conveyor 8. The railings 13 have adjustable width and can be adapted to different bottle formats. In addition, they can be laterally displaced in order to adjust their number and arrangement in relation to the bottle conveyor 8. At the conveyor-side ends, the railings 13 may have oblique guide surfaces for the bottles 3 to slide on and be guided.

The bottles 3 may slide along on the piling table 12 in the upright position. As an alternative, the piling table 12 may also have a conveyor belt or the like, which moves in the direction of conveying of the bottles 3, instead of the stationary base. To take up the bottles 3, the closures of the end areas 10 are cyclically opened, so that the rows 14 of bottles being held there can be pushed onto the piling table 12. As soon as the predetermined length of the row has been reached, the closures of the end areas 10 close again, so that the next batch of bottles can pile up.

The row support 12 has at least one stop 15 each in the area of the bottle guides 13. In the simplest embodiment, the stops 15 may be arranged stationarily. They are now periodically offset axially from one row to the next, and the amount of the offset preferably equals half of the bottle diameter. As a result, the adjacent rows 14 of bottles are arranged offset in relation to one another such that gaps are closed and the tightest possible packing of bottles is formed in the bottle layer 25 to be formed later.

In addition, the stops 15 are axially movable in the embodiment shown and have a controlled drive 16 for this purpose, which is arranged, e.g., on an extension of the table or under the piling table 1). During the takeover of a new load of bottles, the stops 1) are positioned directly in front of the end area 10 of the bottle conveyor). As soon as the closures of the end area 10 open and push out the bottles 3, the stops 15 draw back in a controlled manner and offer an axial guiding for the bottles 3 taken up as a result. As a result, the bottles 3 cannot be knocked over during takeup. On the whole, the bottles 3 are guided all around on four sides in a positive-locking manner during the takeup, and the guiding in the rear is performed by the next bottle 3 following in the row.

After the takeover, the rows 14 of bottles are ready on the row support 12 for the transfer unit 5. The transfer unit 5 is preferably designed as a biaxial or multiaxial robot 11 with freely controllable and programmable axes and has a portal-like cross arm 20, which extends at right angles to the rows 14 of bottles and at which one or more gripping means 17 can move to and fro and lift over or transfer the rows 14 of bottles onto the intermediate carrier 6 kept ready on the feed branch 41.

The gripping means 17 is designed as a multiaxially movable gripping head. It has a plurality of row grippers 18, which grasp the rows 14 of bottles in the row support 12 in a suitable manner in the head area, hold them and release them on the intermediate carrier 6. The row grippers 18 comprise, e.g., long gripping channels with lateral gripping arms, which grasp the bottles under their necks and hold them in a positive-locking manner as a result.

The row grippers 18 may have one or more adjusting means 19. In the embodiment shown, the adjusting means 19 permits a lateral movement of the row grippers 18, as a result of which the rows 14 of bottles can move up closer to one another after the takeup. In the end area 10 and in the row support 12, the rows 14 of bottles are spaced somewhat more widely from one another because of adjustment to the format and for other design reasons. This lateral distance is greater than the distance desired in the bottle layer 25. Due to the lateral movement of the row grippers 18, the rows 14 of bottles can be guided in closely spaced locations from one another and they may even be brought into contact with one another corresponding to the desired packing density. The adjusting means 19 has a suitable drive along with a freely programmable control for this purpose.

The rows 14 of bottles and the intermediate carrier 6 have the same length in the exemplary embodiment shown. To fill the intermediate carrier 6, the rows 14 of bottles are placed next to one another, and the gripping means 17 moves repeatedly to and fro. The bottle layer 25 formed on the intermediate carrier 6 in this embodiment shown is as large as the bottom of the pallet.

In a variant of the embodiment shown, an intermediate carrier 6 may also have overlength and take up two or more bottle layers 25. As a result, two or more rows 14 of bottles must be correspondingly arranged one behind the other on the intermediate carrier 6. The adjusting means (19) may have additional mobility in the longitudinal direction of the row for this purpose and have, e.g., a telescoping means for this for extending the row grippers 18 (not shown). In addition, the adjusting means 19 performs the lifting and lowering movements of the row grippers 18 necessary for the transfer. The row grippers 18 form the bottle guide during the transfer process.

A bottle guide 21 is also present on the intermediate carrier 6, which is preferably trough-shaped. It comprises, e.g., a frame, in which the bottles 3 are guided upright and all around in a positive-locking manner, similarly as in the row support 12. In the embodiment shown, the intermediate carrier 6 has for this purpose a carrier edge 22, which imitates the contour of the bottle and which also takes into account the offset of the rows by means of corresponding projections. A plurality of upright guide pins 23, which extend between four adjacent bottles 3 each, are arranged in the inner area of the intermediate carrier 6. The carrier edge 22 and the guide pins 23 may have slide-on bevels for easier introduction and insertion of the bottles 3. As an alternative, the bottle guides 21 may also be formed in any other manner, e.g., by shelf webs or the like.

The palletizing device 7 may also have different designs. The individual palletizing device 7 has one or more palletizing stations 26, on which the bottle layers 25 are stacked up on a pallet bottom one after another to form a complete pallet 35. The palletizing station 26 is arranged on the side next to the end position of the intermediate carrier 6 and the conveying means 24. One or more insert stacks 27, 28, 29 may join in a row on the other side. These stacks contain the pallet bottoms and the spacers and covers, which are needed for building up the bottle layers 25 and will hereinafter be called palletizing inserts. The spacers and covers are, e.g., cardboard or other suitable, flat materials, which are placed between the bottle layers 25.

The palletizing device 7 has at least one gripping means 30, 31 for transferring the bottle layers 25 from the intermediate carrier 6 onto the palletizing station 26 and for taking in and inserting the palletizing inserts from the stacks 27, 28, 29. Separate gripping means 30, 31 are present in the preferred embodiment in order to increase the performance. The palletizing device 7 is preferably likewise designed as a linear multiaxial robot 11, which has a cross arm 20 extending at right angles to the rows of bottles for displacing the gripping means 30, 31. The gripping means 30, 31 have suitable gripping heads, which can be at least raised and lowered and possibly have additional axes of movements.

The gripping means 31 is designed as a bottle gripper, which preferably grasps the entire bottle layer 25 and transfers it in one stroke onto the palletizing station 26. The gripping means 31 may have an additional axial adjustability in the form of a telescopic arrangement or the like for servicing multilayer and excessively long intermediate carriers 6.

In the exemplary embodiment according to FIG. 1, the two outer high-performance palletizing devices 7 have insert stacks 27, 28, 29 of their own. The gripping means 31 services both intermediate carriers 6. The middle palletizing device 7 shown in greater detail in FIG. 2 is designed for lower capacity. It has two gripping means 31 located at spaced locations from one another for one intermediate carrier 6 each associated with them. Common insert stacks 27, 28, 29 with a gripping means 30 operating in both directions is arranged between the gripping means 31. This services both palletizing stations 26 as a result.

All gripping means 30, 31 in the embodiment according to FIGS. 1 and 2 are arranged within the individual palletizing devices 7 and also on a common cross arm 20 serving the entire unit. The insert stacks 27, 28, 29, the palletizing stations 26 and the end positions of the intermediate carriers 6 are correspondingly arranged in one row next to one another.

The palletizing stations 26 are joined by a pallet conveyor 32 each, which operates in the longitudinal direction of the row and joins a cross belt, preferably with the interposition of a waiting position. Two adjacent pallet conveyors 32 each are connected to one another via the cross belt and are together connected to a packaging device 33. Additional waiting and piling positions may be provided. The cross belt may also be used for the rear-side loading of the insert stacks 27, 28, 29, as is shown in FIG. 2, which is somewhat modified in this respect.

The finished pallets 35 formed at the palletizing station 26 are fed via longitudinal and cross belts to a packaging device (not shown) and wrapped, e.g., with a plastic film here and optionally strapped for stabilization. The packed pallets 35 are made ready for picking up in the adjoining discharge station and are brought from here, e.g., into an intermediate storage facility and farther to the filling unit (not shown).

Figure 5:
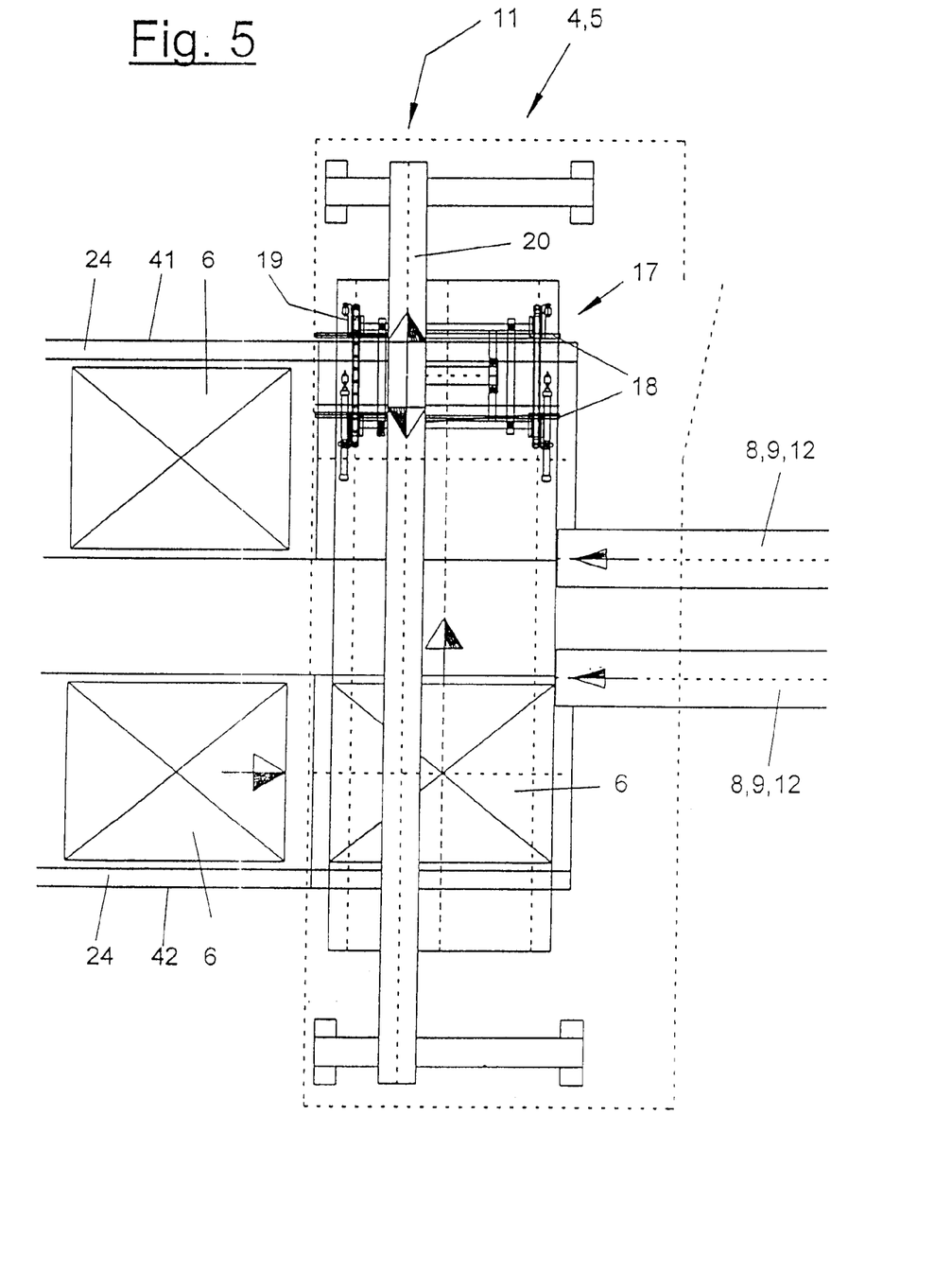
FIG. 5 is a top view of a variant of the collecting device according to FIG. 4.
Figure 6:
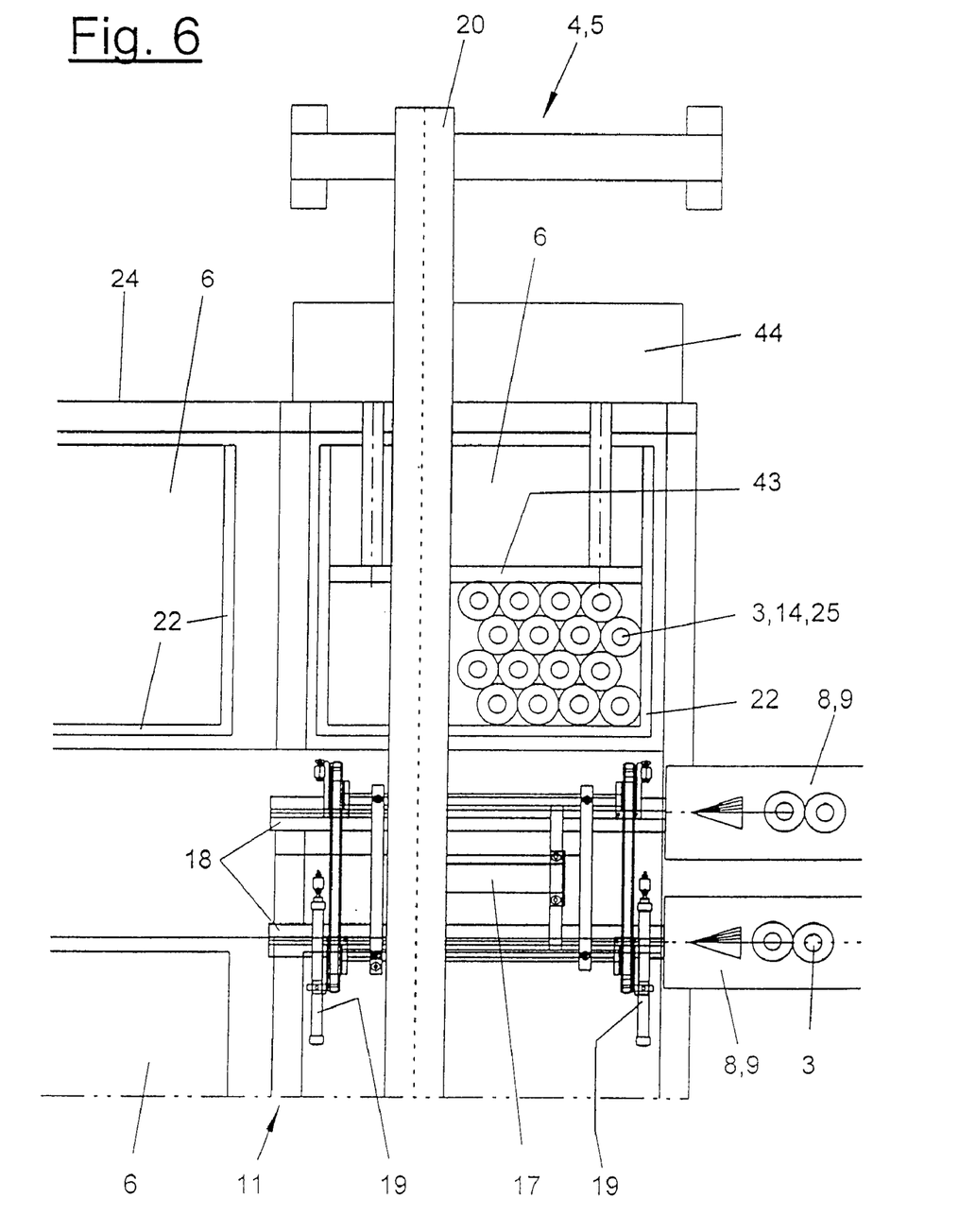
FIG. 6 is an enlarged top view of another variant for FIGS. 4 and 5.

FIGS. 5 and 6 show variants of the collecting device 4 and of the transfer unit 5. In both cases, the transfer unit 5 can take over the bottles 3 from the bottle conveyors 8 directly with the gripping means 17 and without the interposition of a piling table 12. The row grippers 18 are arranged at the same level as the bottle conveyors 8, so that the bottles 3 can be pushed over into the row grippers 18 directly in the hanging position. The adjusting means 19 now permit the row grippers 18 to be adapted and accurately positioned at the bottle conveyors 8. In particular, a plurality of bottle grippers 18 may be loaded simultaneously. In the embodiment shown, the gripping head 17 has two bottle grippers 18. However, their number may also be higher as desired. Their number will preferably correspond to the number of lines 9 and bottle conveyors 8. However, their number may also be different.

The intermediate carriers 6 in FIGS. 5 and 6 may correspond to the embodiment according to FIG. 4. However, FIG. 6 shows yet another variant. The intermediate carriers 6 comprise there trays open on one side with a bottom plate and three carrier edges 22 running around in a U-shaped pattern. Instead of the missing fourth carrier wall, a transversely movable pusher 43 with a suitable drive 44 is provided on the loading side. The pusher 43 forms the lateral bottle guide 21 together with the existing carrier edges 22. The intermediate carrier 6 or its bottom plate has no guide pins 23 standing upright in the middle area in this embodiment.

The pusher 43 is also used to position and push together the bottles 3 on the intermediate carrier 6. The rows 14 of bottles can be deposited by the transfer unit 5 at mutually spaced locations from one another on the intermediate carrier 6. The pusher 43 is somewhat withdrawn for this purpose and offers the necessary free space. The pusher 43 subsequently moves forward again and pushes the deposited rows 14 of bottles onto the rows of bottles already introduced and forms the necessary packing density of the bottle layers 25. Time is saved in this procedure for the transfer unit 5, which is advantageous for the preferred direct loading of the bottle grippers 18 at the bottle conveyors 8. In addition, the intermediate carriers 6 can take up any bottle format as a result. The carrier edges 22 are also designed as smooth walls without guiding profiling in this case. The arrangement of the bottles is shown in FIG. 6 only partially and purely schematically.

The fourth carrier wall may be eliminated for the further conveying of the intermediate carriers 6. The bottle layer 25 is now guided on three sides by means of the three remaining carrier edges 22. As an alternative, the pusher 43 may also be designed as a fourth carrier wall and be connected to the drive 44 in a correspondingly detachable manner. The carrier wall is unhinged during loading and it acts as a pusher plate. At the end of the loading, it is again connected to the intermediate carrier 6 in a suitable manner.

Another variant of the bottle handling system 1 is also possible in terms of the intermediate carrier circulation. In the embodiment shown in FIG. 3, the intermediate carriers 6 circulate within the bottle handling system 1 between the collecting device 4 and the palletizing device 7. They are permanently loaded and unloaded, and they may also be stored temporarily in the loaded or empty state. It is also possible in this variant to use the intermediate carriers 6 to form the pallet 35 and to allow them to leave the bottle handling system 1. In this case, the intermediate carriers 6 preferably have the bottle guides 21 shown in FIG. 4. In addition, the intermediate carriers 6 may also have suitable mutual guides in order to be able to be stacked one on top of another to form a pallet in a simple and self-centering manner. The palletizing device 7 with its robot 11 correspondingly also has a suitable design for this purpose and grips the entire intermediate carrier 6 instead of the individual bottle layers 25 and transfers it for pallet formation. In this variant, the intermediate carriers 6 circulate in a larger circulation, which leads via the filling unit, the wholesaler or wholesalers and the customers and back to the bottle handling system 1 via a reprocessing or cleaning unit. The circulating intermediate carrier 6 now takes up not only the empty bottles 3 loaded on in the bottle handling system 1, but also the full bottles after the filling.

Various modifications of the embodiment shown and described are possible. The bottle conveyor 8 may have any desired, suitable design. Instead of a pneumatic conveyor with the bottles 3 being conveyed in the hanging position, an upright conveyor with rollers, a conveyor belt or other suitable conveying mechanisms may be provided as well. Furthermore, the number of rows 14 of bottles in the area of the bottle conveyor 8 and of the row supports 12 or of the transfer units 5 may vary. The number of rows also does not need to be always equal between the said components. Corresponding statements may also be made concerning the gripping means 31 for transferring the bottle layers 25 at the palletizing station 26. In one variant, the gripping means 31 can grasp and transfer only part of the bottle layer 25. In the other variant with excessively long intermediate carriers 6, it is possible to grasp a plurality of bottle layers 25 all at once. The bottle layer 25 is as large as the area of the pallet bottom in the embodiment described. This size is a matter of definition and can be modified. Different pallet sizes and/or bottle formats are sometimes also processed at a collecting and palletizing unit 2, so that the intermediate carrier 6 is filled only partly. The design of the technical components of the collecting and palletizing units 2, especially of the row support 12, the transfer unit 5, the palletizing device 7, the intermediate carrier 6, etc., is also variable. In particular, the gripping means for grasping the rows 14 of bottles may have a suitable design. The intermediate carrier 6 may be plate-like or have any other suitable shape as a container or carrier for the bottle layers.

While specific embodiments of the invention have been shown and described in detail to illustrate the application of the principles of the invention, it will be understood that the invention may be embodied otherwise without departing from such principles.

What is claimed is:

1. A device for collecting empty bottles and for palletizing the bottles, the device comprising:

a bottle source feeding a plurality of empty bottles;

an upstream collecting device for taking over the empty bottles being fed in, in one or more rows from said bottle source and having at least one transfer unit with plural row grippers for grasping plural rows of bottles at the neck of the empty bottles or below a neck flange of the empty bottles and moving the bottles;

a conveyor extending a distance and having a loading porsition disposed adjacent to said collecting device;

one or more intermediate carriers having a bottom and being on said conveyor and being positionable adjacent to said collecting device, said transfer unit taking up the empty bottles in layers with said plural row grippers moving the rows of bottles and transferring the rows of bottles onto said intermediate carrier by grasping one or more rows of bottles at the neck of the empty bottles or below a neck flange of the empty bottles to form a bottle layer with rows of bottles on said intermediate carrier, a total number of rows of bottles on said intermediate carrier being greater than a total number of said plural row grippers for grasping plural rows of bottles;

a palletizing device, said conveyor extending to adjacent to said palletizing device and transporting said intermediate carriers between said collecting device loading position to said palletizing device said palletizing device for taking over bottles from said intermediate carriers and building up one or more layers of bottles on a pallet support with inserts between adjacent layers of bottles.

2. The device in accordance with claim 1, wherein said conveyor means waves from said collecting device loading position to said palletizing device and in a reverse direction.

3. The device in accordance with claim 1, further comprising a storage facility provided for the intermediate storage of said intermediate carriers.

4. The device in accordance with claim 1, wherein said transfer unit and said intermediate carriers are equipped with a bottle guide and each of said intermediate carriers has walls extending up from said bottom.

5. The device in accordance with claim 1, wherein said bottle source is a bottle producer and said collecting device is arranged directly at said bottle producer, said bottle producer including a bottle blowing machine.

6. The device in accordance with claim 1, wherein said grippers include a plurality of laterally adjustable row grippers.

7. The device in accordance with claim 1, wherein said palletizing device has two palletizing stations placed at spaced locations from one another, each of said two palletizing stations including a gripping means for gripping bottle layers, said palletizing device having an insert stack shared by each of said two palletizing stations as well as with a palletizing insert gripping means for gripping the palletizing inserts, the palletizing insert gripping means being shared by the two palletizing stations.

8. The device in accordance with claim 1, wherein a plurality of collecting and palletizing devices are arranged next to one another with common cross arms.

9. The device in accordance with claim 1, wherein said intermediate carrier is a tray with an intermediate carrier bottle guide having a shaped carrier edge and a plurality of guide pins in an inner area.

10. The device in accordance with claim 9, wherein said intermediate carrier bottle guide has a movable carrier edge.

11. The device in accordance with claim 1, further comprising;

an insert stack wherein said palletizing device has a palletizing station arranged adjacent to said insert stack for inserting palletizing inserts on said intermediate carriers.

12. The device in accordance with claim 11 wherein said palletizing device includes an insert gripping means for gripping palletizing inserts and a bottle layer gripping means for gripping bottle layers.

13. The device in accordance with claim 1, wherein said palletizing device includes a linearly multiaxial robot with cross arms and a robot gripping means that can be displaced as well as raised and lowered and wherein said transfer unit includes a linearly multiaxial robot with cross arms and said grippers-that can be displaced as well as raised and lowered.

14. The device in accordance with claim 13, wherein said gripping means of said palletizing device is displaceable at right angles to a direction of feed of the bottles on said intermediate carriers and said grippers of said transfer unit are displaceable at right angles to said direction of feed of the bottles on said intermediate carriers.

15. A device far collecting empty PET-bottles and for palletizing filled or empty PET bottles, the device comprising:

a source of empty PET bottles;

a conveyor;

an upstream collecting device for taking over the empty bottles being fed in from said source in one or more rows, said collecting device having at least one transfer unit with a plurality of grippers, each of said grippers for grasping a row of the PET bottles from said source, lifting the grasped row by the neck of the PET bottles or by the neck flange of the PET bottles;

a palletizing device for taking empty or full PET bottles and for palletizing groups of the empty or full PET bottles including providing layers of rows of bottles on a support with each layer separated by an insert, said conveyor extending from a loading position adjacent to said collecting device to an unloading position adjacent to said palletizing device;

a plurality of intermediate carriers, each of said intermediate carriers having a bottom and being on said conveyor and being movable by said conveyor from said loading position to said unloading position, said bottom receiving empty bottles in rows with one or more of said row grippers transferring the row of bottles onto said intermediate carrier by moving the grasped row of bottles to over the intermediate carrier and releasing the empty bottles with the bottles deposited on said bottom, a total number of rows of bottles on each tray being greater than a number of grippers at said upstream collecting device.

16. The device in accordance with claim 15, wherein said bottle source is a bottle producer.

17. The device in accordance with claim 15, further comprising a bottle filling unit disposed along said conveyor, said bottle filling unit filling bottles on said intermediate carrier between said transfer unit and said palletizing device.

18. The device in accordance with claim 15, wherein said conveying means has a movement that circulates between said loading position and said unloading position or moves from said loading position to said unloading position and from said unloading position to said loading position.

19. The device in accordance with claim 15, wherein said storage facility stores filled intermediate carriers containing filled or unfilled bottles.

20. The device in accordance with claim 15, wherein said bottle source is a bottle conveyor.

* * * * *